May 10, 1927.
R. E. GAMBLE
1,627,965
BALL BEARING ASSEMBLING DEVICE
Filed June 23, 1922
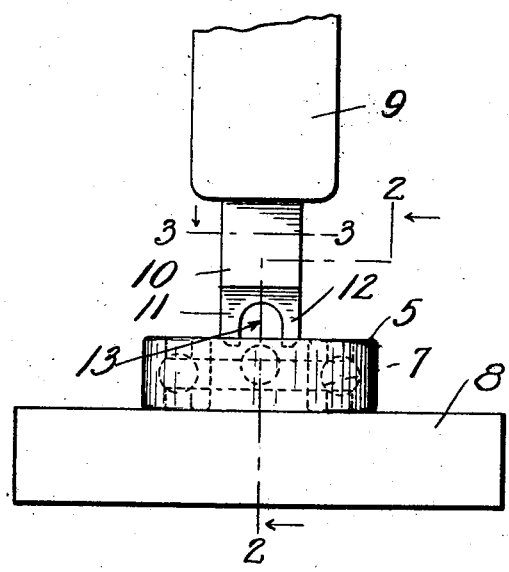
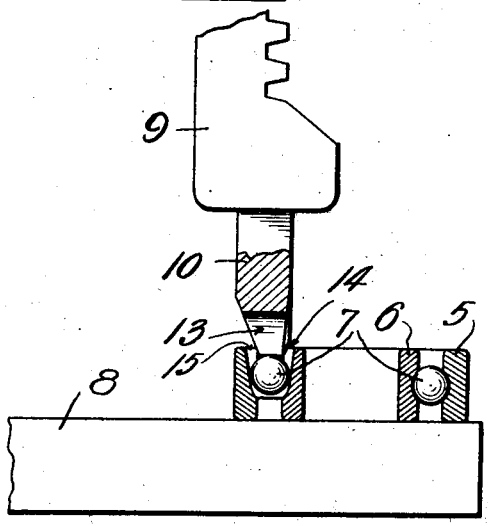
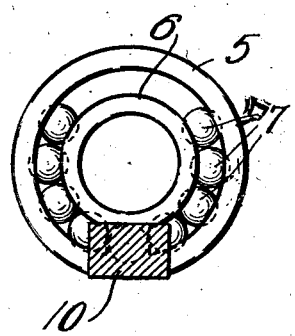
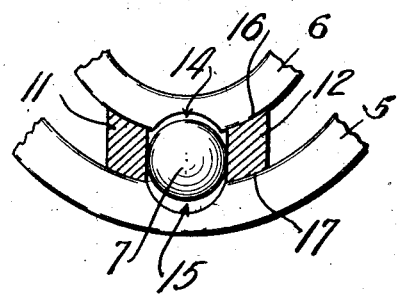
Inventor
Robert E. Gamble
By his Attorney
Abel L. Browning Patented May 10, 1927.

1,627,965

UNITED STATES PATENT OFFICE.

ROBERT E. GAMBLE, OF PHILADELPHIA, PENNSYLVANIA, ASSIGNOR TO STANDARD STEEL AND BEARINGS INCORPORATED, OF PHILADELPHIA, PENNSYLVANIA, A CORPORATION OF DELAWARE.

BALL-BEARING-ASSEMBLING DEVICE.

Application filed June 23, 1922. Serial No. 570,476.

This invention relates to a device for use in inserting ball members between the race rings of ball bearings.

In assembling ball bearings by heretofore known methods in order to place the last few balls in position between the rings, it has been the practice either to heat the outer ring to produce a sufficient expansion thereof to permit the final balls of the set to enter the grooves through the filling slots or to press or snap the balls into place through the filling slots under sufficient pressure to distort the interengaged parts. These methods of assembly are open to the objection that the heating of the outer ring not only involves operations that add to the cost of manufacture of the bearings, but the heating operation may injure the outer ring if not carefully governed. On the other hand forcing the final balls through the filling slots without heating the outer ring produced abrasion and distortion of the balls and surfaces of the slots and otherwise injuriously affected the construction.

The principal objects of this invention are to provide means for inserting balls between bearing race rings which will be free from the objections referred to, and which will provide a bearing construction with increased "snap" or constriction of the filling passage due to a correspondingly increased height of the bottom of the slots at the groove end thereof and with a resulting increased effectiveness in the prevention of displacement of the balls from the grooves into the slots in operation.

The invention includes the provision of a forked wedging member formed to be forced between the race rings on opposite sides of the filling notches, the wedging action of the member forcing the rings apart by the application of pressure on areas where abrasion or distortion will produce no injury to the bearing. The spreading apart of the ring members at points flanking the filling notches has the effect of enlarging the opening formed by the oppositely disposed filling notches sufficiently to permit balls to pass through the opening by their own weight or with the assistance of a relatively gentle push exerted by a simple tool in the hands of the operator. The central notch or cleft which forms the forked end of the wedging member and separates the individual wedge is of such size and conformation that a ball member may be readily contained therein before passing through the filling slots of the bearing which is being assembled.

In the drawings, in which a preferred form of the invention has been selected for illustration, Figure 1 is a view in front elevation of a device embodying the invention and showing the manner of its use in a bearing assembling operation.

Figure 2 is a view partly in side elevation and partly in section of the parts shown in Figure 1.

Figure 3 is a plan view of the bearing and the filling device shown in Figure 1 in operative position.

Figure 4 is an enlarged view in section of a detail taken on the line 4—4 of Figure 1.

Referring to the drawings for a more detailed description of the invention a ball bearing of the concentric ring or annular type and including an outer race ring 5 and an inner race ring 6 is illustrated. In Figure 1 of the drawings the confronting grooves of the race rings are shown filled with as many ball members 7 as can be placed in position between the rings by relative eccentric displacement thereof. In order to insert the few remaining balls needed to complete the complement the rings 5 and 6 with the interposed ball members 7 are placed on the bed or anvil 8 of a suitable form of arbor press, the plunger 9 of which is provided with a wedging or ring separating tool 10.

The wedging tool 10, as is clearly shown in Figure 1, is provided with a forked lower extremity forming two laterally separated wedging members 11 and 12 with an interposed slot or opening 13 of such size and conformation that ball members used in filling the bearing can be placed therein.

In operation, a ball is placed in the oppositely disposed entrance openings of the filling notches 14 and 15 of the partly filled rings 5 and 6. As the filling notches are not cut to the bottom of the raceway grooves but are provided with shoulders at the groove terminating ends which are spaced apart by a distance less than the diametrical width of the balls, the balls cannot be passed freely through the notches into the raceway grooves. The wedging tool 10 is then lowered into position to bring the wedge members 11 and 12 into engagement with the confronting radial flanges 16 and 17 of the race rings on opposite sides of the filling slots and in spanning relation to the ball resting in the entrance ends of the filling slots. Downward pressure is then brought to bear on the tool 10 whereupon the wedge members 11 and 12 operate to force the rings further apart in the vicinity of the filling slots with the result that the ball either drops into place in the raceway grooves or can be assisted into position by the exertion of relatively slight pressure with any suitable hand tool.

By this method of assembly the rings are forced apart by a springing or stretching action that is well within the elastic limit of the metal and the rings immediately spring back to their true circular conformation when the wedging tool is removed following the passing of the ball into place. No abrasion or distortion of the surface of the filling slots in the rings or of the balls can take place when the filling device described is employed, with the result that a greatly improved efficiency in the operation of assembling ball bearings is effected. In addition, a greater height of the bottom of the slots above the raceway paths in the grooves is rendered possible by this method of filling thus providing an increased "snap" or constriction of the filling passage and increasing the height of the ball retaining wall of the groove at the junction of the slots and grooves.

What I claim is:

1. In a device for loading ball bearings, a wedging member having a forked construction, the members of the forked portion being separated tangentially with relation to the curvature of the race rings when the wedging member is in operative position, the members of the fork being adapted to engage the opposing surfaces of the ring on opposite sides of the filling opening, and the recess separating the members of the fork extending upwardly into the wedging member a sufficient distance to provide for the placing of a ball in position therein and over the filling slot, whereby when the wedging member is pressed into separating relation with the rings the ball will drop through the opening into the raceway grooves.

2. In a device for use in assembling ball bearings of the type including concentric race rings having side filling slots, a wedging member having a forked construction, the members of which are spaced apart tangentially of the rings when in operative position and having a forked construction forming spaced apart wedging elements integrally connected and spaced apart tangentially of the rings when the device is in operative position and adapted for forcing the rings apart at both sides of the filling slots in circumferential relation to the slots, the space between the wedging elements having a size and conformation to permit a ball to be passed into the said space while the wedging member is in operative position and occupy the entrance end of the filling slots at the beginning of the wedging operation.

ROBERT E. GAMBLE.